(12) United States Patent
Scaldaferri et al.

(10) Patent No.: US 8,513,920 B2
(45) Date of Patent: Aug. 20, 2013

(54) CHARGE CURRENT REDUCTION FOR CURRENT LIMITED SWITCHED POWER SUPPLY

(75) Inventors: Stefano Scaldaferri, Kirchheim Teck (DE); Eric Marschalkowski, Inning a A. (DE); Christian Wolf, Neuffen (DE)

(73) Assignee: Dialog Semiconductor GmbH., Kirchheim/Teck-Nabern (GB)

( * ) Notice: Subject to any disclaimer, the term of this patent is extended or adjusted under 35 U.S.C. 154(b) by 963 days.

(21) Appl. No.: 12/384,188

(22) Filed: Apr. 1, 2009

(65) Prior Publication Data
US 2010/0237845 A1    Sep. 23, 2010

(30) Foreign Application Priority Data
Mar. 19, 2009  (EP) .................... 09368008

(51) Int. Cl.
*H02J 7/00*  (2006.01)
(52) U.S. Cl.
USPC ..... 320/137; 320/139; 320/140; 320/DIG. 10
(58) Field of Classification Search
USPC ............................ 320/137, 139–141, DIG. 10
See application file for complete search history.

(56) References Cited

U.S. PATENT DOCUMENTS

| | | | | |
|---|---|---|---|---|
| 5,625,275 A * | 4/1997 | Tanikawa et al. | ............. | 320/160 |
| 5,698,964 A * | 12/1997 | Kates et al. | ............. | 320/164 |
| 5,721,481 A | 2/1998 | Narita et al. | | |
| 5,990,665 A | 11/1999 | Kawata et al. | | |
| 6,229,286 B1 * | 5/2001 | Tokuyama | ............. | 320/132 |
| 6,232,745 B1 * | 5/2001 | Tokuyama | ............. | 320/132 |
| 6,275,007 B1 * | 8/2001 | Tokuyama | ............. | 320/132 |
| 6,300,744 B1 * | 10/2001 | Shum | ............. | 320/137 |
| 6,452,364 B1 * | 9/2002 | Saeki et al. | ............. | 320/137 |
| 7,019,507 B1 | 3/2006 | Dittmer et al. | | |
| 7,035,071 B1 | 4/2006 | Tiew et al. | | |
| 7,235,955 B2 | 6/2007 | Solie et al. | | |
| 7,365,526 B2 | 4/2008 | Cha et al. | | |
| 7,595,615 B2 * | 9/2009 | Li et al. | ............. | 323/277 |
| 7,990,106 B2 * | 8/2011 | Hussain et al. | ............. | 320/128 |

(Continued)

FOREIGN PATENT DOCUMENTS
WO   WO 96/37941   11/1996

OTHER PUBLICATIONS

European Search Report 09368008.0-1242, Jun. 24, 2009, Dialog Semiconductor GmbH.

(Continued)

*Primary Examiner* — Edward Tso
*Assistant Examiner* — Manuel Hernandez
(74) *Attorney, Agent, or Firm* — Saile Ackerman LLC; Stephen B. Ackerman

(57) ABSTRACT

Circuits and methods for a switched power converter providing charge power for at least one battery and at the same time delivering current to operate an electronic device, wherein the converter is enabled to operate out of current limit mode, for the maximum possible range of system load requirements, have been achieved. The input current of the power converter is measured within each cycle-by-cycle, i.e. within each cycle of an external clock reference and the charge current is reduced if the input current exceeds a defined portion, e.g. 80% of the maximum allowable input current. The power converter may only enter current limited operation after the charge current has been already reduced to zero. Operating out of current limit mode ensures a maximum efficiency of the converter, maximize the current deliverable to a given load and minimizes subharmonics in the output current and voltage, thereby minimizing interference with other system component.

17 Claims, 7 Drawing Sheets

(56) References Cited

U.S. PATENT DOCUMENTS

| | | | |
|---|---|---|---|
| 2001/0040410 A1* | 11/2001 | Akiba | 307/39 |
| 2005/0237688 A1 | 10/2005 | Wong et al. | |
| 2006/0176021 A1 | 8/2006 | Krause | |
| 2008/0258688 A1* | 10/2008 | Hussain et al. | 320/145 |
| 2009/0267571 A1* | 10/2009 | Wolf et al. | 320/162 |

OTHER PUBLICATIONS

"Fully Integrated Switch-Mode One-Cell Li-Ion Charger with Full USB Compliance and USB-OTG Support," Texas Instruments Incorporated Application Note, Product Folder Link(s): bq24150, bq24151, SLUS824—Jun. 2008, pp. 1-34 and 5 Addendum pages.

* cited by examiner

FIG. 1 – Prior Art

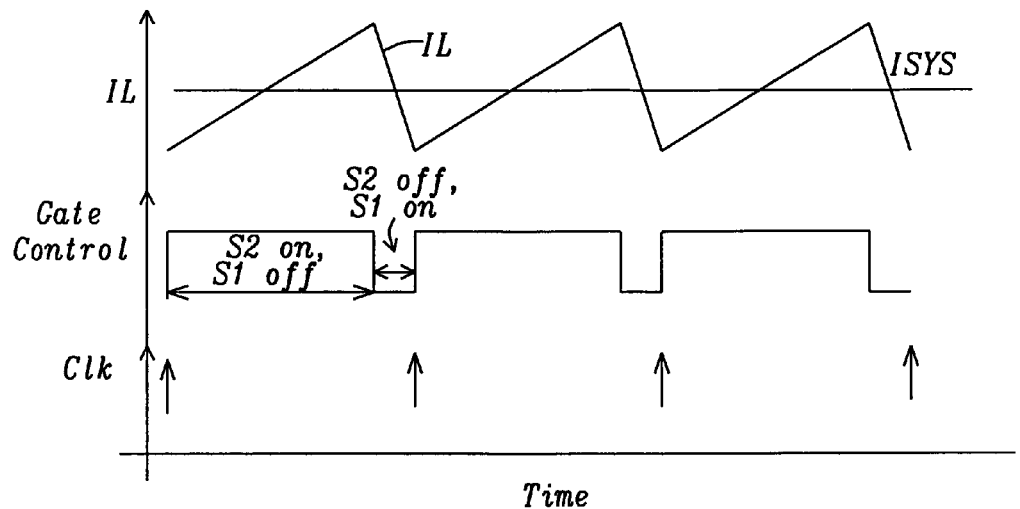
FIG. 3 – Prior Art
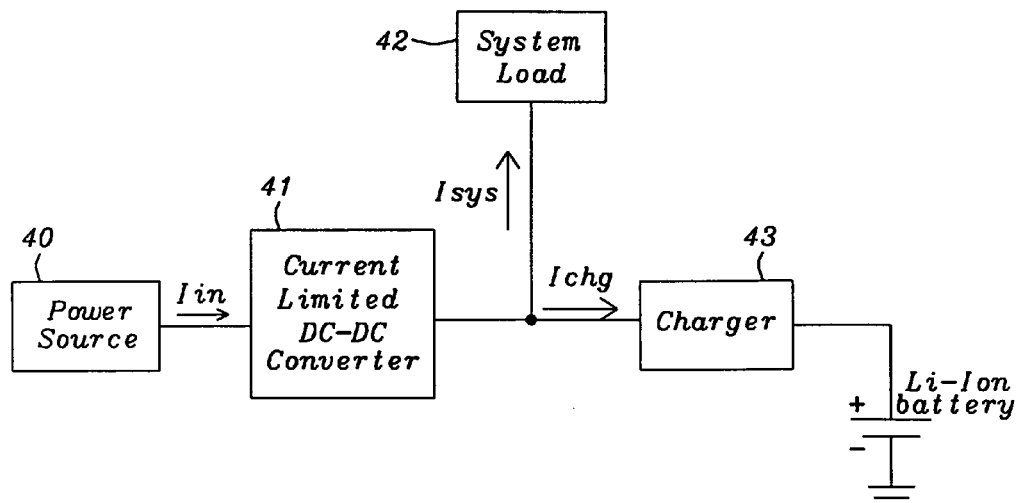
FIG. 4

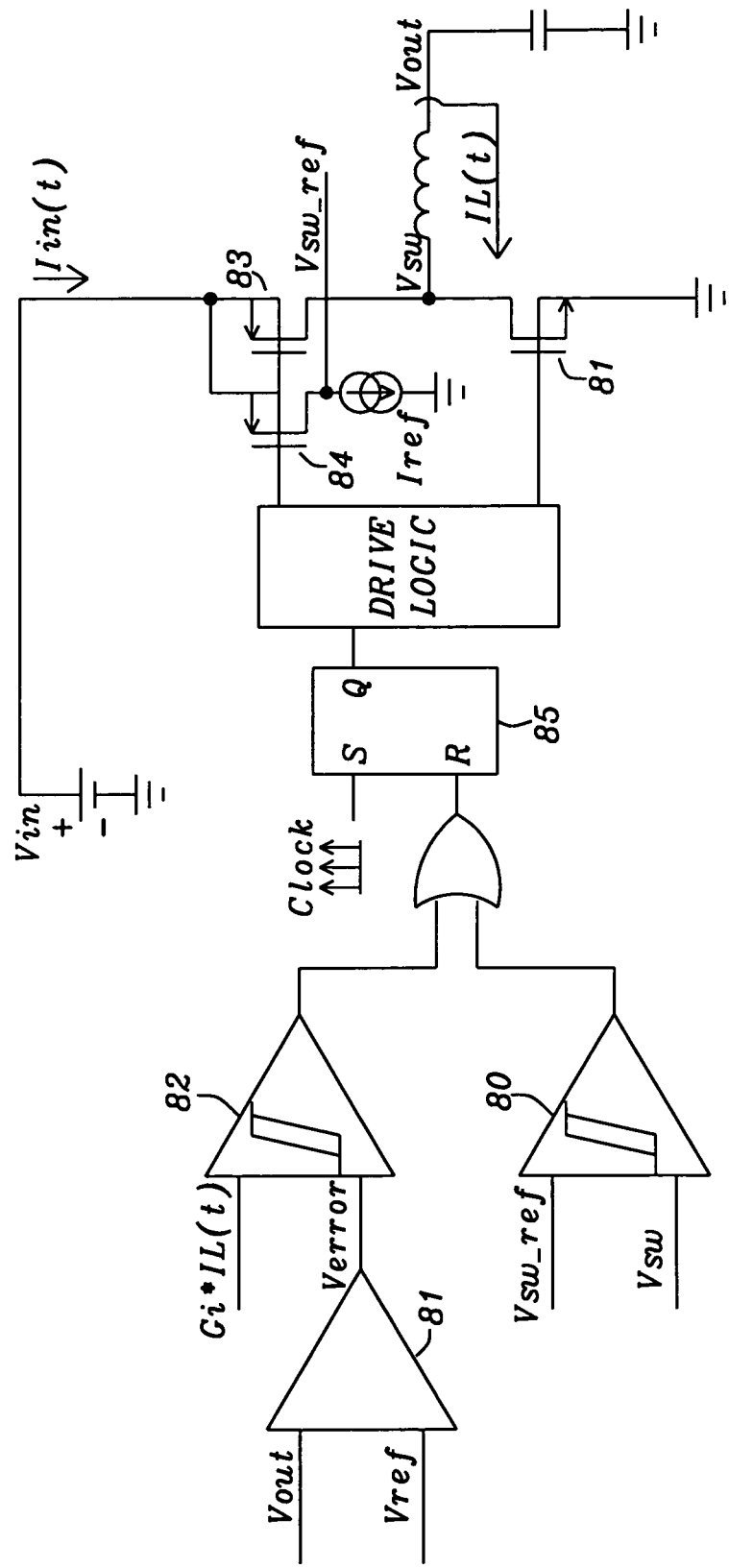
FIG. 8 – Prior Art

CHARGE CURRENT REDUCTION FOR CURRENT LIMITED SWITCHED POWER SUPPLY

BACKGROUND OF THE INVENTION (1) Field of the Invention

This invention relates generally to the field of DC-to-DC converters and relates more specifically to switched power supplies converters having a programmable input current limit and a controlled limited output current in order to operate with maximum efficiency and providing a regulated power supply to battery equipped systems. The power supply is required to provide the charge current to the battery while, at the same time, being able to deliver current to the system.

(2) Description of the Prior Art

Buck or Boost Converters find extensive use in power management applications because of their high efficiency. They can step up or down an input voltage source to a different voltage supply DC level more appropriate for a specific load.

They use a storage element device (an inductor) on which energy is alternatively stored and then delivered to a load. At this purpose switches are used, whose ON and OFF states are defined by the high and low times of a usually fixed frequency digital control signal. It is common practice to implement a closed loop solution which adapt the duty cycle of the digital control signal in such a way to maintain a constant DC voltage at the output over a wide range of a system current requirements.

FIG. 1 illustrates the basic layout of a prior art buck converter. It comprises a DC voltage source Vin, a first switch S1, a second switch S2, an inductor L (as energy storage element) and an output capacitor C to filter the output voltage Vout. The control circuitry 1 receives as input a constant frequency Clk signal and a reference voltage Vref and, as feedback, the output voltage ΔΣlt generates gate drive control signals for the switches S1 and S2, which are synchronous to the Clk, i.e. they have constant frequency, but whose duty cycle is adjusted in such a way that the output voltage Vout tracks the reference voltage Vref for a wide range of system loads and/or input supply fluctuations. The operation of the buck converter of FIG. 1 is described also with reference to FIG. 3 where the Clk signal, the current through the inductor IL and the gate control signal are also shown in steady state conditions. The switch S2 is turned on (and correspondingly the switch S1 is turned off) at constant frequency, synchronously to the input clock signal, there by connecting the voltage source Vin to the inductance L. The current IL rises linearly with a slope $$\frac{Vin - Vout}{L}.$$

Within the clock period the switch S2 is turned off (and correspondingly the switch S1 turned on), thereby connecting the inductance to Ground. In this phase the current IL decreases linearly with a slope $$\frac{Vout}{L}.$$

In steady state condition the following condition must hold $$\frac{Vin - Vout}{L} Ton = \frac{Vout}{L} Toff,$$

leading therefore to the following relationship $$Vout = \frac{Ton}{T} Vin.$$

The output voltage Vout depends from the duty cycle of the gate control signal, the input supply voltage Vin and, even if not explicitly apparent from this first order analysis, from the output load Isys, i.e. a current supporting a system load.

In order to keep the output voltage Vout tracking a given reference voltage Vref, the control circuitry 1 varies the duty cycle of the gate control signal. This can be done in a number ways: generally the control loop provides a voltage Verror, as shown in FIG. 8 prior art, which is proportional to the difference between Vout and the reference Vref. This voltage is then compared to a ramp signal with a saw-tooth waveform, to generate a PWM signal, which then controls the status of switches. The ramp signal can be a constant signal (voltage mode control) or it may be proportional to the inductor current IL (current mode control).

FIG. 8 prior art shows a particular implementation of a current mode control buck converter. In this scheme the voltage/current feedback loop provided by the amplifier 81 and the PWM comparator 80 regulates the output duty-cycle in such a way that output voltage Vout tracks reference voltage Vref. In particular the main switch 83 is turned-on at the beginning of each clock cycle. It is only turned off when the positive input of the PWM comparator 82, which is proportional to the output current, exceeds the error voltage Verror.

A desirable feature of a DC-DC converter is a peak current limitation capability by which the current drawn from the input power supply Vin is confined below a (usually programmable) target value at any time. This property is essential in particular when dealing with output limited power supply, i.e. USB input, and to protect the regulator's component and the system load from an excessive current flow.

In the current practice a cycle-by-cycle current limit scheme is implemented: at each cycle of an external clock signal the current in the supply path is sensed and compared to a reference. Whenever its value exceeds this reference, the power converter high side switch is turned off instantaneously. It will be again turned on in the next clock cycle.

In the architecture of FIG. 8 prior art, the current limit is implemented comparing the drain source voltage $V_{sw}$ of the main switch 83 with a drain source voltage $V_{sw\_ref}$ of a scaled matched device 84 through the comparator 80. If M is the scaling factor of the main switch 83 related to the device 84, this comparator will toggle when input current Iin>Iref multiplied by scaling factor M, wherein Iref is a reference current which can be externally set by a current source. In this condition the SR-latch 85 will be reset, thereby turning off the main switch 83 and turning on the synchronous rectifier 87. The comparator 80 is reset in the next clock cycle.

In current limit conditions the output duty cycle is not determined anymore by the voltage/current feedback loop provided by the amplifier 81 and the PWM comparator 82, but by the comparator 80. The high side power switch 83 can be turned off at any time within the clock period independent of the PWM comparator output. As shown in FIG. 3 this leads to an unsteady behavior of the output current IL characterized by the presence of sub-harmonics of the clock frequency (which could interfere with other system's component), an increased ripple which leads to more power losses and less efficiency, a reduced maximum average power deliverable to the load.

DC-DC converters are widely used in battery equipped system such that of FIG. 4 to provide current both to the battery and the system. While the system requirements are normally unpredictable and heavily user's dependent, the charge current is normally settable from the system itself. It would be highly desirable in this case, and in general in any case a fraction of the DC-DC converter output current is controllable by a system host, to have a mechanism which automatically reduce the charge current before the buck converter enters current limit conditions and this for the largest possible range of load current requirements.

There are patents or patent publications dealing with the operation of buck converters:

(U.S. Pat. No. 7,365,526 to Cha et al.) discloses a synchronous buck DC/DC converter performing an improved switching operation by adjusting a variable resistor is provided. The synchronous buck DC/DC converter includes a switching unit for switching two PWM signals inverted with a dead time and outputting the PWM signals, a smoothing circuit for outputting DC power using a waveform output from the switching unit as an input, a variable resistor connected to the switching unit and adjusting a switching time of the waveform output from the switching unit, and a variable resistor controller for sensing a current from an output terminal of the smoothing circuit and setting the resistance of the variable resistor to a resistance corresponding to the sensed current.

(U.S. Pat. No. 7,235,955 to Solie et al.) proposes a controllably alternating buck mode DC-DC converter conducting cycle by cycle analysis of the direction of inductor current flow to decide whether to operate in synchronous buck mode or standard buck mode for the next successive cycle. For each cycle of the PWM waveform controlling the buck mode DC-DC converter, a mode control circuit examines and latches data representative of the direction of inductor current flow relative to the chargeable battery. If the inductor current flow is positive, a decision is made to operate in synchronous buck mode for the next PWM cycle, which allows positive current to charge the battery; if the inductor current drops to zero, a decision is made to operate the converter in standard buck mode for the next PWM cycle, so as to prevent current from flowing out of the battery and boosting the system bus.

(U.S. Pat. No. 7,035,071 to Tiew et al.) discloses a switching regulator having a current limit with adaptive cycle skipping. A buck type switching regulator circuit is provided, including an energy storage component, such as an inductor or capacitor, and a switch for controllably providing an input current to the energy storage component. A control unit controls the on time and the off time of the switch by providing cyclically recurring control pulses to the switch that cause the switch to be on during the pulses and off otherwise. A current monitor circuit monitors a current corresponding to the input current applied to the energy storage component during the periodic control pulses. An overcurrent signal generator generates an overcurrent signal pulse upon detection of the monitored current at a level above a predetermined level corresponding to an overcurrent condition. A state machine responds to the overcurrent signal pulse and suppresses a number of the cyclically recurring control pulses, thereby controlling the period between the recurring control pulses that are not suppressed, in accordance with a predetermined algorithm that increases the number each time an overcurrent signal pulse is detected in successive periods.

(U.S. Pat. No. 7,019,507 to Dittmer et al.) discloses methods and circuits for protecting power converters from overcurrent conditions that, in one embodiment, (1) reduce average inductor current to a steady-state threshold during a transient phase and regulate average inductor current in steady-state regulation approximately at the steady-state threshold; and (2) reduce instantaneous inductor current after the instantaneous inductor current exceeds a maximum instantaneous threshold during the transient phase.

Furthermore Texas Instruments has published an application note "Fully Integrated Switch-Mode One-Cell Li-Ion Charger with Full USB compliance and USB-OTG support" describing a charge management device for single cell batteries, wherein charge parameters can be programmed through an $I^2C$ interface. The bQ24150/1 charge management device integrates a synchronous PWM controller, power MOSFETs, input current sensing, high accuracy current and voltage regulation, and charge termination, into a small WCSP package.

SUMMARY OF THE INVENTION

A principal object of the present invention is to achieve a switched power converter, supplying battery equipped systems, remaining out of current limit conditions for the maximum possible range of system load requirements.

A further object of the present invention is to maximize the efficiency of a switched power converter, avoiding that it enters current limit condition for the maximum possible range of system load requirements.

Another object of the present invention is to achieve a switched power converter having the least amount of output current sub-harmonics, avoiding that it enters current limit condition, for the maximum possible range of system load requirements.

Moreover another object of the present invention is to maximize the average current deliverable from a switched power converter to a system load, avoiding that it enters current limit conditions for the maximum possible range of system load requirements.

In accordance with the objects of this invention a method allowing switched power converters, providing charge power for at least one battery and at the same time delivering current to operate an electronic device, to stay out of current limit mode for the maximum possible range of system load requirements, has been achieved. The method invented comprises the following steps: (1) providing a synchronous switched power converter, a means to measure the input current of the switched power converter, and means to control a charge current, (2) sensing an input current of the switched power supply and go to step (3) and to step (5), and (3) checking if the input current is higher than an input current limit of the power converter and, if negative, repeat step (3), else go to step (4). The following steps are (4) reducing said input current turning off the power converter high side switch of the power converter and go to step (3), (5) checking if the actual input current is higher than a defined portion of a maximum input current limit of the power converter and, if negative, repeat step (5), else go to step (6), and (6) reduce the charge current and go to step (5).

In accordance with the objects of this invention a switched power converter providing charge power for at least one battery and at the same time delivering current to operate an electronic device, enabled to stay in synchronous mode out of current limit mode for the maximum possible range of system load requirements has been achieved. The power converter invented comprises a DC voltage source, a means to sense the input current of the power converter, a controllable charger for said at least one batteries, and a digital control circuitry controlling said charger, wherein said charger reduces a charge current if the input current is higher than a defined portion of a maximum allowable input current.

In accordance with the objects of this invention a switched power converter providing charge power for at least one battery and at the same time delivering current to operate an electronic device, enabled to stay out of current limit mode for the maximum possible range of system load requirements has been achieved. The power converter comprises, first, a DC voltage source, an inductor, wherein a first terminal is connected to a second terminal of a main switching means and to a first terminal of a rectifying switching means and a second terminal is connected to a output port of the buck converter, wherein the output port is connected to said electronic device and to a controllable charger of batteries, a capacitor being connected between said output port and ground, and a said controllable charger. Second, the power converter comprises said main switching means, wherein its first terminal is connected to said DC voltage source, said rectifying switching means, wherein its second terminal is connected to ground, a drive logic circuitry controlling said main switching means and said rectifying switching means, receiving inputs from a SR latch, and a means of current measurement monitoring a current provided by said DC voltage source. Furthermore the power converter comprises said SR latch, wherein its output is connected to said drive logic circuitry and a first input is connected to an internal clock and a second input is connected to the output of an OR-gate, said OR gate, wherein a first input is connected to the output of a first comparing means and a second input is connected to the output of a second comparing means, said first comparing means wherein a first input is a voltage proportional to a current through said inductor and a second input is the output of an amplifier, and said second comparing means wherein a first input is a voltage proportional to an input current of the power converter and a second input is a first reference voltage proportional to a maximum allowable input current. Moreover the power converter comprises said amplifier, wherein a first input is an output voltage of the power converter and a second input is a second reference voltage, a third comparing means wherein a first input is a voltage proportional to the input current of the power converter and a second input is a third reference voltage being proportional to the defined portion of the maximum allowable input current and its output is connected to a digital control circuitry, and said digital control circuitry, wherein its output is controlling said charger in a way that a charging current is reduced if the input current of the power converter is higher than a defined portion of the maximum allowable input current of the power converter.

BRIEF DESCRIPTION OF THE DRAWINGS

In the accompanying drawings forming a material part of this description, there is shown:

FIG. 3 illustrates simplified waveforms of the switch control signal and inductor output current of a synchronous buck converter.

FIG. 4 illustrates a power path of a power management unit supplying a battery operated system.

DESCRIPTION OF THE PREFERRED EMBODIMENTS

The preferred embodiments disclose methods and systems to achieve a switched power supply supporting a battery charger and a system load, wherein a charge current is reduced when the switched power supply is close to enter current limit mode due to high system current.

Shown in FIG. 4 is the typical context of applicability of the present invention. FIG. 4 illustrates a power path of a power management unit supplying a battery operated system inclusive a battery charger and a battery. A synchronous DC-DC converter 41 is used to satisfy the current requirements of a battery operated system. It has to deliver the charge current $I_{chg}$ to charger 43 while at the same time feeding a system load 42 with a current $I_{sys}$ dependent upon the actual system activity.

For this purposes the DC-DC converter 41 draws a current $I_{in}$ from a power source 40, which must never exceed a predefined value $I_{lim}$, which is externally settable.

Figure 5:
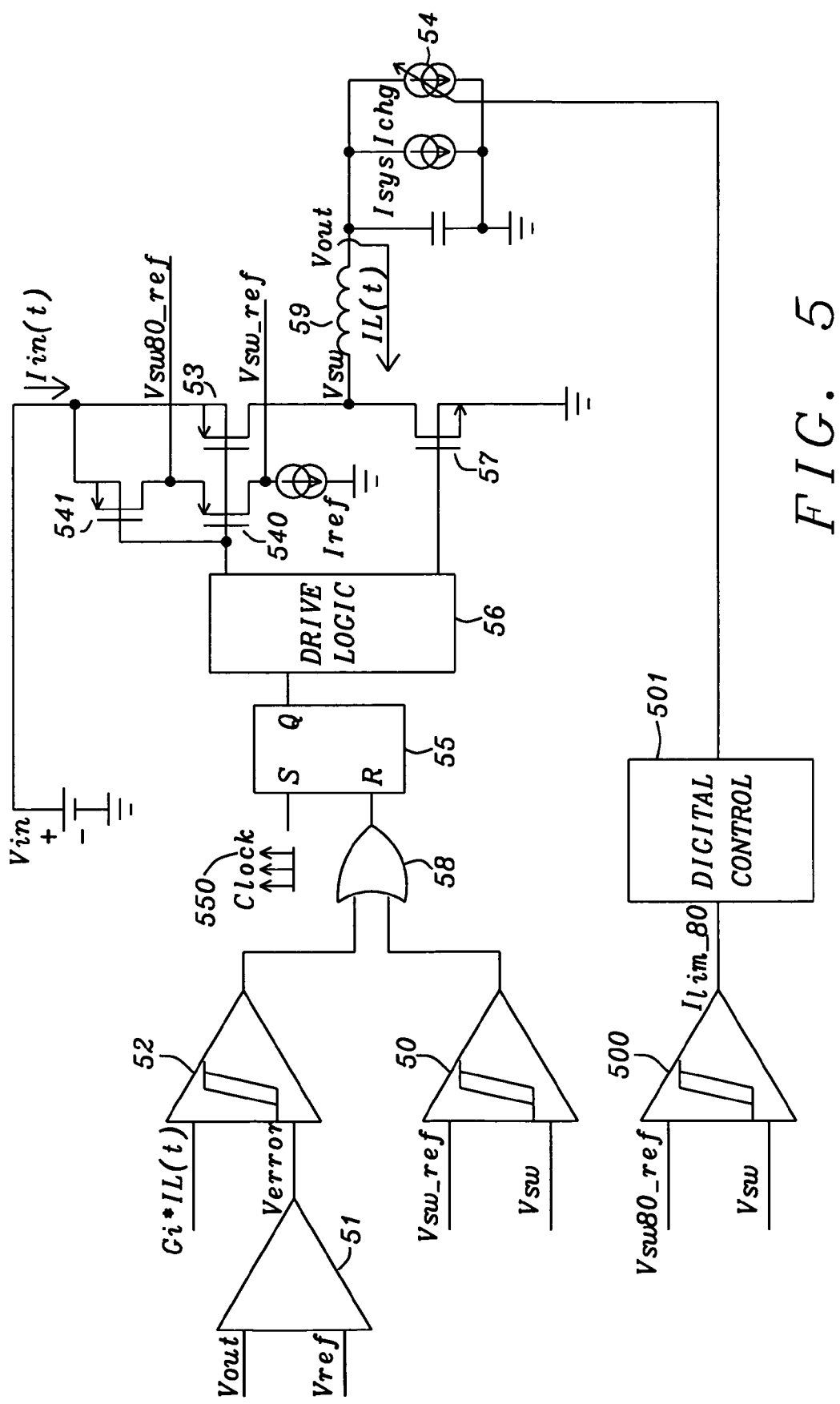
FIG. 5 shows a simplified architecture of a synchronous DC-DC converter of the present invention.

FIG. 5 shows a simplified architecture of a synchronous DC-DC converter of the present invention. In normal operation, i.e. when the buck converter is not in current limit mode, the output of comparator 50 is always low, therefore the voltage/current feedback loop provided by amplifier 51 and PWM comparator 52 regulates via OR-gate 58 the output duty-cycle in such a way that the output voltage $V_{out}$ tracks reference voltage $V_{ref}$. In particular main switch 53 is turned-on via drive logic 56 at the beginning of each clock cycle. It is only turned off when the positive input of the PWM comparator 52, which is proportional, using a factor $G_i$, to the output current $I_L$, exceeds the error voltage $V_{error}$, which corresponds via a factor Ge to the difference between $V_{out}$ and $V_{ref}$.

The current through coil 59 is sensed in the PMOS pass device 53, via a scaled matched PMOS device whose source is connected to the power supply $V_{in}$ via a sense resistor (This sense device is not shown in FIG. 5 in order to avoid unnecessary complexity). In this way a controllable fraction of the inductor current is converted in a voltage across the sense resistor. This voltage is then suitably amplified to obtain the desired current gain factor $G_i$ and fed into the positive input of comparator 52.

A current reference Iref, which can be externally set, flows in the series connected PMOS devices 540 and 541, defining therefore at their drains two voltage reference Vsw_ref and Vsw80_ref, which are connected to the positive terminals of respectively comparator 50 and 500. The PMOS devices 540 and 541 are designed to be scaled version of the main switch 53, in such a way that the voltage of on the drain of main switch transistor 53 will be less than the voltage on the drain of 540 (Vsw<Vsw_ref) when Iin>M*Iref, wherein M is the scaling ratio of the main switch 53 to the equivalent device composed by the series of 540 and 541. The switching node Vsw is connected to the negative input of the comparators 50 and 500. Given the forgoing, comparator 50 will toggle when Iin>M*Iref determining the turning off of the main switch 53, independently of the voltage/current feedback loop described in the preceding paragraph. The comparator 50 will be reset in the next clock cycle even if this function is not shown in figure for simplicity. In this condition the power converter is said to be in current limit mode (with all the disadvantages associated with it) and the current limit is simply defined by the scaling ratio M and the reference current Iref as Ilim=M*Iref.

Figure 1:
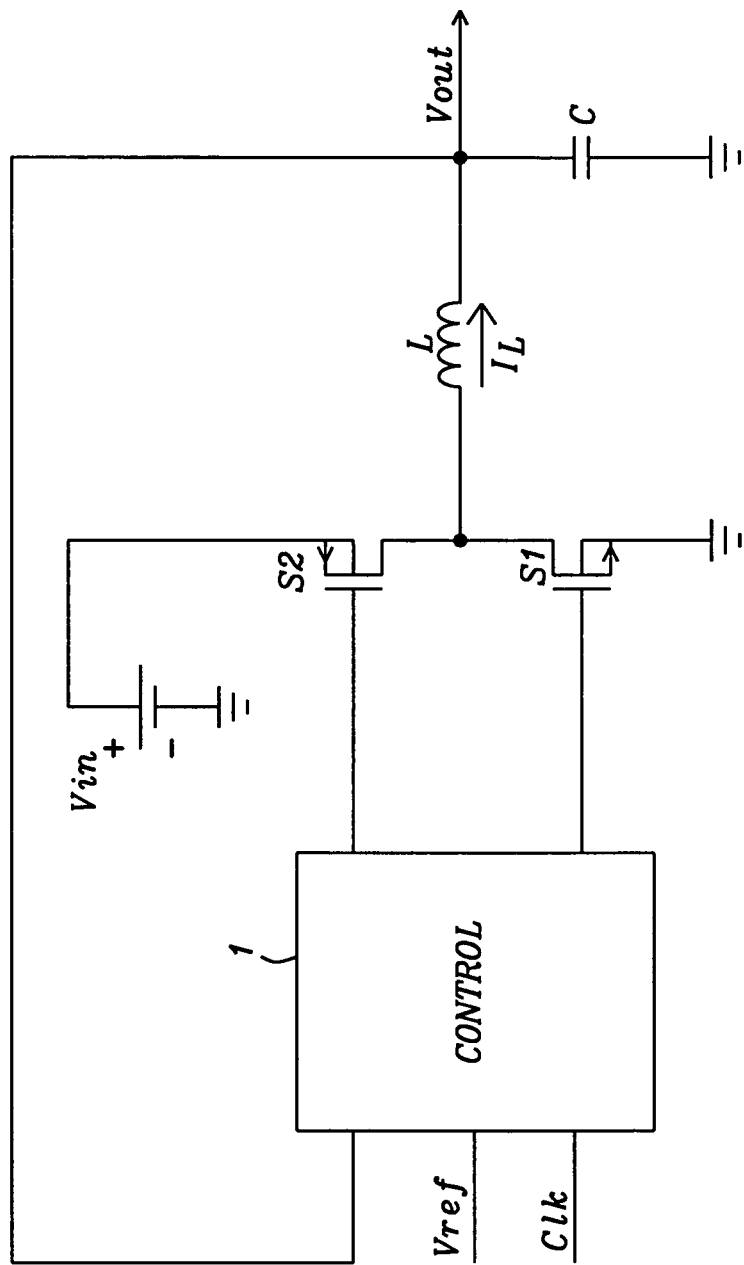
FIG. 1 prior art illustrates the basic layout of a synchronous buck converter.

The second reference voltage Vsw80_ref is tapped in the scaled series device composed by 540 and 541 in such a way that the voltage on the drain of main switch transistor 53 will be less than that on the drain 541 (Vsw<Vsw80_ref) when Iin>K*Ilim, where K is a percentage of the input current limit which is defined by specific transistors dimensions. Transistor 57 is a switch corresponding to switch S2 shown in FIG. 1.

In a preferred embodiment the defined portion of the maximal allowable current limit is 80%. Therefore the variable is called $V_{SW80\_REF}$. Other percentages could be used as well, as long as the response time of the digital control described in the following is shorter than the time required from a given load to cover the difference between the input current limit Ilim and its fraction K*Ilim, i.e. as long as the digital control described in the following is able to reduce the charge current to 0, before the system load can increase from K*Ilim to Ilim.

In case the input current $I_{in}$ has reached the defined portion of the maximum allowable input current, e.g. 80% of the current limit, the charging current $I_{CHG}$ is reduced via digital control 501 and a charger 54 wherein the charge current is controlled by the digital control 501.

If the input current is below 80% of the programmed current limit, the charge current is set to its default value. As soon as the input current reaches the 80% limit, the charge current is decreased until eventually the input current falls again below the 80% limit. At this point the controller starts ramping up the charge current again. In this way for any system load $I_{SYS}$, defining an input current Iin below the programmed current limit, the buck converter runs in normal mode, i.e. not in current limit mode.

Figure 6:
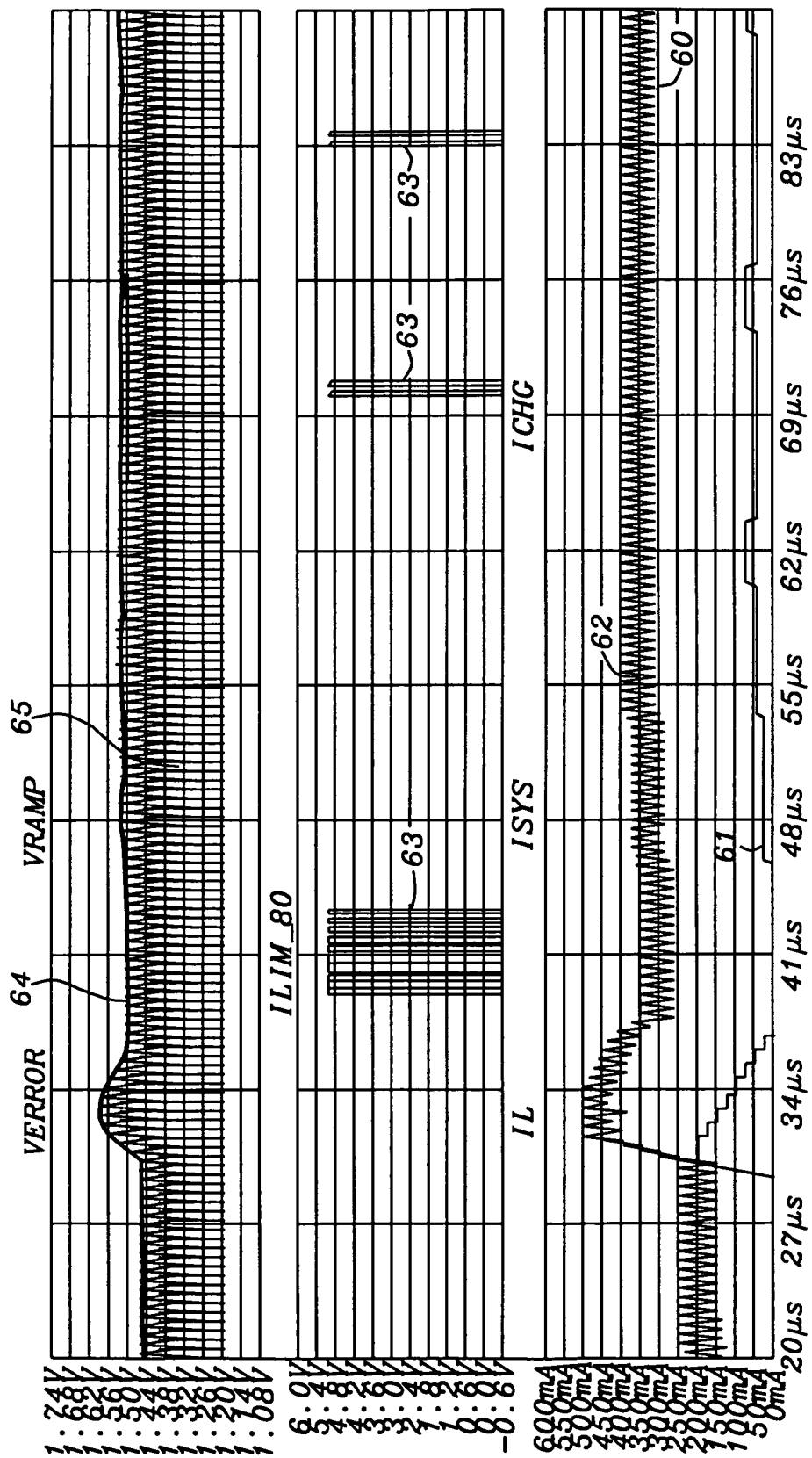
FIG. 6 illustrates simplified waveforms showing the dynamic behavior of the present invention in a typical applications in which a DC-DC converter, charging a battery with a given charge current ICHG, is requested of a system current ISYS from the battery operated system.

FIG. 6 illustrates the behaviour of the buck converter of the present invention operating e.g. with a maximum input current ILIMIT=500 mA, a required system current for an electronic device ISYS=300 mA, and a default charge current ICHG=200 mA. The system current 60 is switched on at time T. The peak input current 62 (which is the same as the peak inductor current IL) is kept in steady state below 400 mA (80% of ILIMIT) and the charge current 61 is reduced accordingly. The buck runs always in normal mode, i.e. the output duty cycle at the node Vsw in FIG. 5 is determined by the voltage/feedback loop, the output current in the inductor is synchronous to the external clock and no sub-harmonics are present, hence the efficiency is maximized, together with the maximum deliverable current, while the interference with other system component, operating for example at audio frequencies, is minimized.

Figure 2:
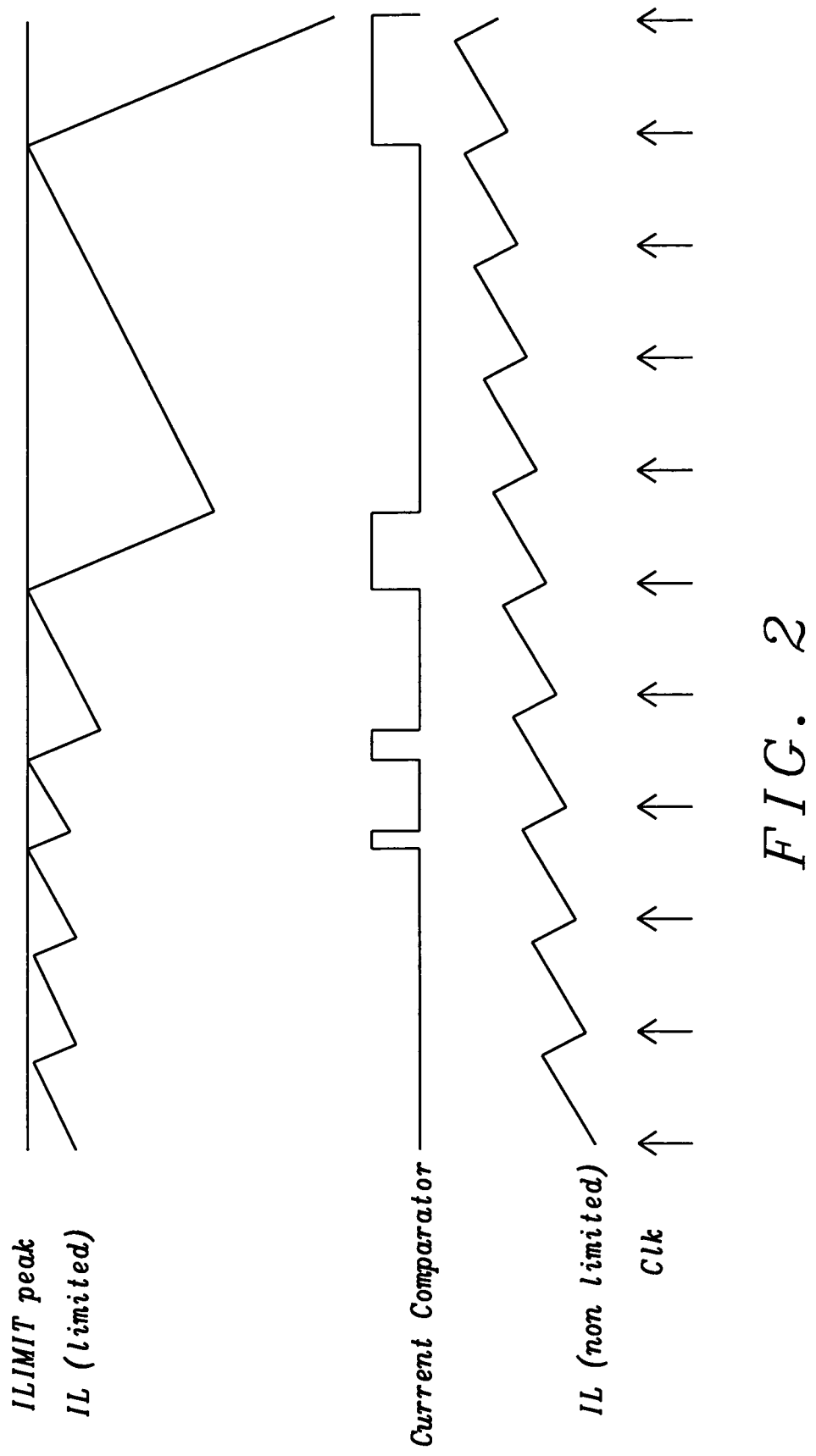
FIG. 2 illustrates simplified waveforms of the switch inductor output current of a synchronous buck converter operating in normal mode and in current limit mode.

FIG. 2 illustrates simplified waveforms of the switch inductor output current of a synchronous buck converter operating in normal mode and in current limit mode. FIG. 2 shows clock pulses Clk, a peak current limit and a current $I_L$ through the inductor in current limit mode and the pulses of a current comparator which goes ON if the current $I_L$ reaches the current limit. Furthermore at the bottom of FIG. 2 the current $I_L$ is shown in unlimited mode. In the unlimited mode the current $I_L$ is rising steadily with every clock cycle.

FIG. 3 illustrates simplified waveforms of the switch control signal and inductor output current of a synchronous buck converter. It shows a constant current $I_{SYS}$ to a system load, as shown in FIG. 4, the inductor current $I_L$ in current limit mode, the switch control signal from the gate control, and the clock signal Clk. FIG. 3 illustrates that switch S2 goes OFF if current $I_L$ reaches a limit, hence current $I_L$ goes down, and with the next clock cycle S2 goes ON and switch S1 goes OFF and current $I_L$ rises again.

Furthermore FIG. 6 shows the output voltage 63 of comparator 500, illustrating a condition of entering the 80% limit and hence reducing the charge current. On top of FIG. 6 the output voltage $V_{error}$ 64 is shown which is the output voltage of amplifier 51 shown in FIG. 5 and voltage $V_{RAMP}$ 65. Vramp 65 corresponds to the positive input of comparator 52 namely to Vramp=$G_i$*$I_L$ where $I_L$ is the inductor current when the PMOS pass device 53 is enabled.

Figure 7:
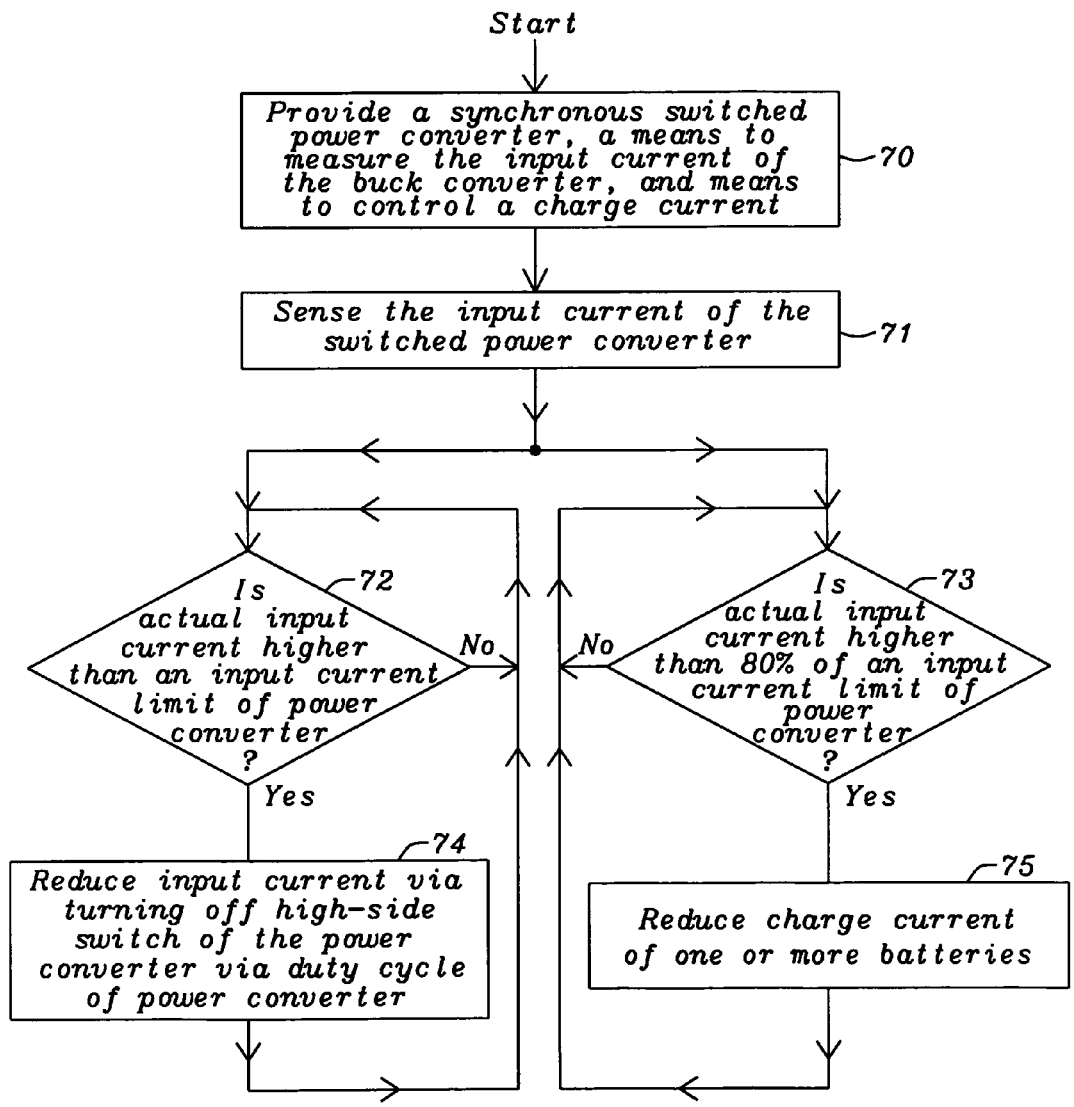
FIG. 7 illustrates a flowchart of a method invented allowing switched power converters, providing charge power for batteries and at the same time deliver current to operate an electronic device, to remain out of current limit mode for the maximum possible range of system load requirements FIG. 8 prior art illustrates a an embodiment of a prior art buck converter.

FIG. 7 illustrates a flowchart of a method invented allowing switched power converters, providing charge power for batteries and at the same time deliver current to operate an electronic device, to stay out of current limit mode for the maximum possible range of system load requirements. A first step 70 describes the provision of a synchronous switched power converter, a means to measure the input current of the buck converter, or any other switched power converter, and means to control a charge current. The following step 71 describes sensing of the input current of the switched power converter. The following steps illustrate two parallel checks of steps 72 and step 73. Step 72 is a check if the actual input current of the switched power converter is higher than a defined maximum current limit. The actual input current is continuously sensed for this check. If this check is positive the process flow goes to step 74 wherein the input current is reduced via turning off the switched power converter highside switch of the power converter and then the process flow goes back to step 72. If the check of step 72 is negative, step 72 is immediately repeated again in the next clock cycle.

Step 73 is a check if the actual input current of the switched power converter is higher than 80% of a defined maximum current limit. The actual input current is continuously sensed this limit of 80% of the defined maximum. If this check is positive the process flow goes to step 75 wherein the charge current of one or more batteries is reduced and then the process flow goes back to step 73. If the check of step 73 is negative, step 73 is immediately repeated again in the next clock cycle. It is obvious that any other suitable portion than 80% could be used as well, as long as the time required to reduce the charge current to 0 is less than the minimum time it requires the system load to increase from this portion to the maximum.

While the invention has been particularly shown and described with reference to the preferred embodiments thereof, it will be understood by those skilled in the art that various changes in form and details may be made without departing from the spirit and scope of the invention.

What is claimed is:
1. A method allowing switched power converters, providing simultaneously charging power for at least one battery and current to operate an electronic device, to stay out of current limit mode for the maximum possible range of system load requirements, comprising the following steps:
   (1) providing a synchronous switched power converter, a means to measure an input current of the switched power converter, and means to control a charge current;
   (2) sensing the input current of the switched power converter and perform steps 3 and 5 in parallel;

(3) checking if the input current is higher than a maximum input current limit of the power converter and, if negative, repeat step (3) in a next clock cycle, else go to step (4);
(4) reducing said input current via turning off a high-side switch of said power converter and go to step (3);
(5) checking if the actual input current is higher than a defined portion of the maximum input current limit of the power converter and, if negative, repeat step (5), else go to step (6); and
(6) reduce the charge current and go to step (5).

2. The method of claim 1 wherein said switched power converter is a buck converter.

3. The method of claim 1 wherein said input current is sensed via a voltage drop generated by the input current on an on-resistance of the high side switch.

4. The method of claim 1 wherein said checking if the input current is higher than the maximum input current limit is performed by comparing a voltage drop generated by the input current on an on-resistance of the high side switch with the voltage drop generated by a reference current on an on-resistance of a scaled device matched to the high side switch.

5. The method of claim 1 wherein said checking if the input current is higher than a said defined portion of the maximum input current limit is performed by comparing a voltage drop generated by the input current on an on-resistance of the high side switch with a voltage drop generated by a reference current on an on-resistance of a separated scaled device matched to the high side switch.

6. The method of claim 1 wherein said defined portion of the maximum input current limit is 80%.

7. The method of claim 1 wherein said sensing of the input current is performed cycle-by-cycle in each cycle of an external clock signal.

8. A switched power management unit providing charge power for at least one battery and simultaneously delivering current to operate an electronic device, enabled to stay out of current limit mode for the maximum possible range of system load requirements, comprising:
a switched power converter comprising:
a port for a DC voltage source;
a means to detect if an input current of the power converter exceeds a maximum allowable input current, which is configured to initiate shutting off a high side switch if the input current of the power converter exceeds the maximum allowable input current;
said high side switch;
a means to detect if the input current of the power converter exceeds a defined portion of the maximum allowable input current; and
a digital control circuitry controlling a charger, wherein said charger reduces a charge current if the input current of the power converter is higher than the defined portion of the maximum allowable input current; and
said controllable charger for said at least one battery;
wherein said means to detect if the input current of the power converter exceeds the maximum allowable input current and said means to detect if the input current of the power converter exceeds the defined portion of the maximum allowable input current comprises two comparators, a first comparator reducing directly the input current of the power converter via turning off the high side switch, and a second comparator reducing indirectly the input current of the power converter via controlling a digital circuit which in turn reduces a fraction of a current load.

9. The system of claim 8 wherein said switched power converter is a buck converter.

10. The system of claim 8 wherein said defined portion of a maximum allowable input current is 80%.

11. The system of claim 8 wherein said means to sense the input current comprises sensing a voltage drop produced by the input current on an on-resistance of a transistor.

12. The system of claim 8 wherein said means to detect if the input current exceeds the maximum allowable input current and the defined portion of the maximum allowable input current comprises two transistors in series matching a high side buck converter switch, a current reference forced through them and generating two voltage references on their on-resistance, corresponding to the maximum allowable input current and to the defined portion of the maximum allowable input current.

13. A switched power management unit providing charge power for at least one battery and simultaneously delivering current to operate an electronic device, enabled to stay out of current limit mode for the maximum possible range of system load requirements, comprising:
a switched power converter comprising:
a port for a DC voltage source;
an inductor, wherein a first terminal of the inductor is connected to a second terminal of a main switching means and to a first terminal of a rectifying switching means and a second terminal of the inductor is connected to an output port of the switched power converter, wherein the output port is connected to said electronic device and to a controllable charger of batteries;
a capacitor being connected between said output port and ground;
said main switching means, wherein the first terminal of said main switching means is connected to said port for said DC voltage source;
said rectifying switching means, wherein a second terminal of said rectifying switching means is connected to ground;
a drive logic circuitry controlling said main switching means and said rectifying switching means, receiving inputs from a SR latch;
a means of current measurement monitoring an input current of the power management unit provided by said DC voltage source;
said SR latch, wherein an output of the SR latch is connected to said drive logic circuitry and a first input of the SR latch is connected to an internal clock and a second input of the SR latch is connected to an output of an OR-gate;
said OR gate, wherein a first input of the OR gate is connected to an output of a first comparing means and a second input is connected to an output of a second comparing means;
said first comparing means, wherein a first input of the first comparing means is a voltage proportional to a current through said inductor and a second input of the first comparing means is an output of an amplifier;
said second comparing means wherein a first input of the second comparing means is a voltage proportional to the input current of the power management unit provided by said DC voltage source and a second input is a first reference voltage proportional to a maximum allowable input current of the power management unit;
said amplifier, wherein a first input of the amplifier is an output voltage of the switched power management unit and a second input is a second reference voltage;

a third comparing means, wherein a first input of the third comparing means is a voltage proportional to the input current of the power management unit and a second input of the third comparing means is a third reference voltage being proportional to a defined portion of the maximum allowable input current of the power management unit and an output of the third comparing means is connected to a digital control circuitry; and said digital control circuitry, wherein an output of said digital control circuitry is controlling said charger in a way that a charging current is reduced if the input current of the power management unit is higher than the defined portion of the maximum allowable input current of the power management unit, and said controllable charger.

14. The system of claim 13 wherein said switched power converter is a buck converter.

15. The system of claim 13 wherein said defined portion of the maximum allowable input current is 80%.

16. The system of claim 13 wherein said main switching means is a transistor.

17. The system of claim 16 wherein a drain voltage of said transistor is compared to drain voltages of two scaled transistors in series matching said transistor, wherein a drain of a first transistor is connected to a source of a second transistor and a drain of the second transistor is connected to a current source and gates of both transistors are connected to each other and to said drive logic circuitry, and wherein a voltage on said drain of said second transistor corresponds to the maximum allowable input current of the power management unit and a voltage of the source of said second transistor corresponds to the defined portion of the maximum allowable input current of the power management unit.

* * * * *